Figure 11:
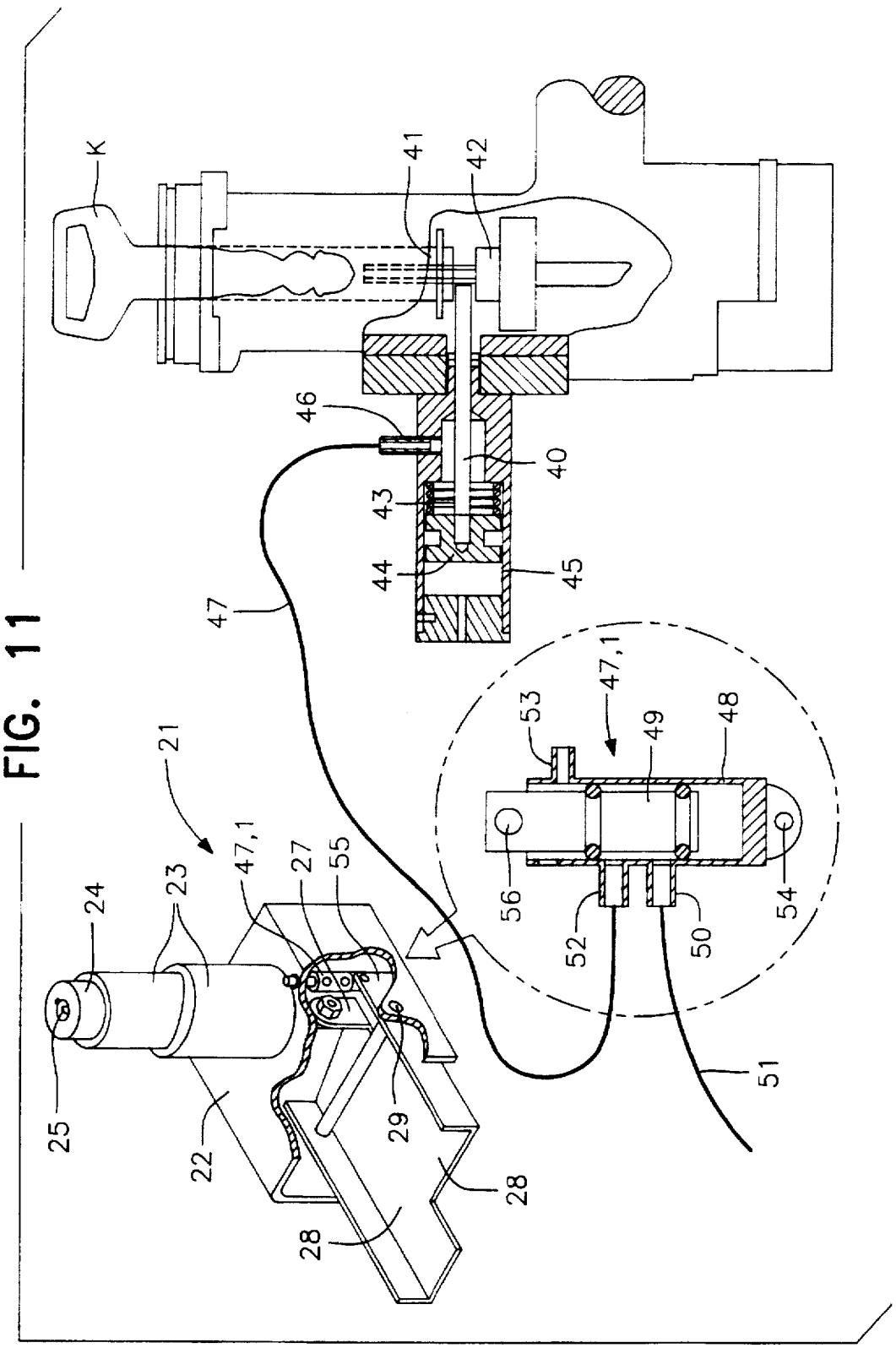

United States Patent [19]
Van Wyk

[11] Patent Number: 5,791,175
[45] Date of Patent: Aug. 11, 1998

[54] VEHICLE ANTI THEFT DEVICE

[76] Inventor: Alphonso Albertus Van Wyk, 250 Smuts Avenue, Verwoerdburg, South Africa

[21] Appl. No.: 628,261

[22] Filed: Apr. 5, 1996

[51] Int. Cl.⁶ .................................................. E05B 65/12
[52] U.S. Cl. .................. 70/247; 70/237; 70/202; 70/257; 74/526; 74/473.21
[58] Field of Search ................ 70/245, 247, 248, 70/237, 202, 201, 252, 256, 257; 74/526, 527, 473.21

[56] References Cited

U.S. PATENT DOCUMENTS

| | | | |
|---|---|---|---|
| 1,185,285 | 5/1916 | Brewster | 70/247 |
| 1,222,085 | 4/1917 | Donovan et al. | 70/203 |
| 1,296,099 | 3/1919 | McDonald | 70/202 |
| 1,388,035 | 8/1921 | Gorden | 70/201 |
| 1,398,455 | 11/1921 | De Clairmont | 70/201 |
| 1,471,212 | 10/1923 | Schiff | 70/201 |
| 1,480,323 | 1/1924 | White | 70/201 |
| 1,631,157 | 6/1927 | Reason | 70/247 |
| 1,998,208 | 4/1935 | Still | 74/473.22 |
| 3,949,581 | 4/1976 | Toyama et al. | 70/257 |
| 4,282,769 | 8/1981 | Sandrock | 70/201 |
| 5,150,593 | 9/1992 | Kabayashi et al. | 70/248 |
| 5,207,124 | 5/1993 | Anderson et al. | 70/248 |
| 5,251,466 | 10/1993 | Chang | 70/248 |
| 5,309,744 | 5/1994 | Kito et al. | 70/248 |
| 5,490,585 | 2/1996 | Togano | 70/248 |
| 5,551,265 | 9/1996 | Garman et al. | 70/247 |

FOREIGN PATENT DOCUMENTS

| | | |
|---|---|---|
| 0641692A1 | 3/1995 | European Pat. Off. . |
| 2646820 | 11/1990 | France ............... 70/16 |
| 1090529 | 10/1960 | Germany ............ 70/247 |
| 3939748 | 10/1990 | Germany ............ 70/248 |
| 878241 | 11/1987 | South Africa . |
| 915169 | 7/1991 | South Africa . |
| 2155874 | 10/1985 | United Kingdom . |

Primary Examiner—Darnell M. Boucher
Attorney, Agent, or Firm—Jacobson, Price, Holman & Stern, PLLC

[57] ABSTRACT

A vehicle security device against theft which comprises a mechanism built into the vehicle out of sight as original equipment or for the after market. The device is built into the gear change console (manual or automatic) housing which is usually a metal pressing fixed to the floor pan so that the mechanism is tamper proof. The mechanism is a plate which lifts into a position in which it locks the gear change into the reverse position, it is released by a high security key on the console. A servo is available to lock the ignition key in its socket to prevent it being withdrawn until the gear lock has been activated, to prevent people forgetting to activate the security device, assuming they are in the habit at least of removing the key before leaving the vehicle. This servo can work on a pneumatic or other basis.

4 Claims, 5 Drawing Sheets

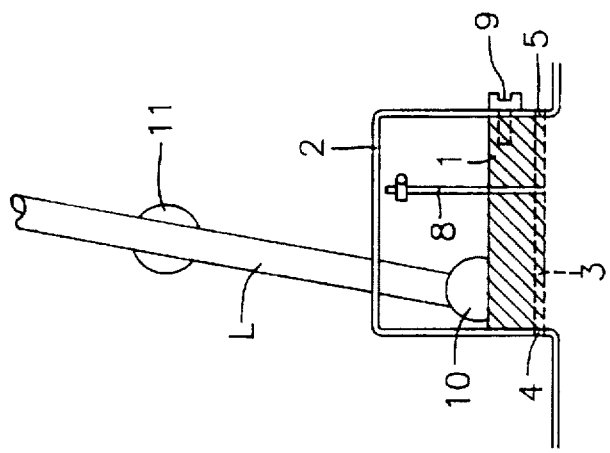
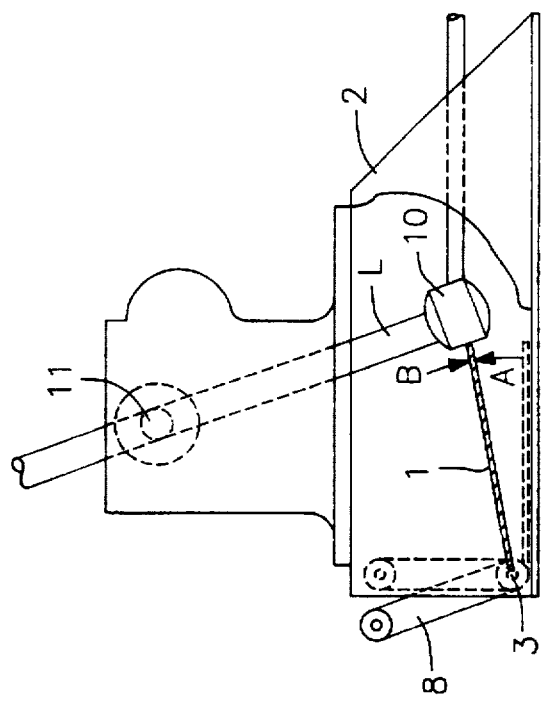
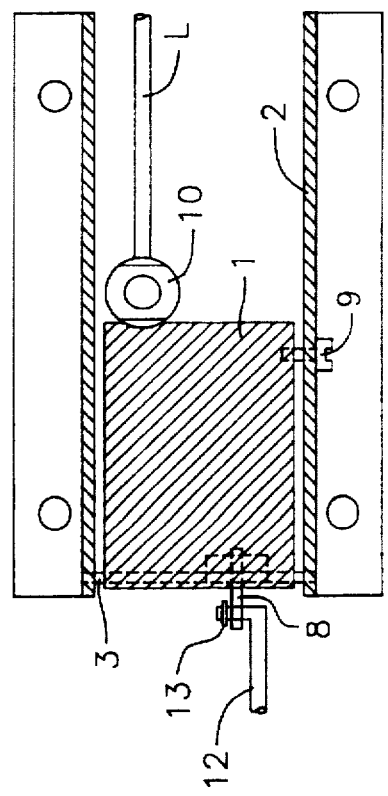
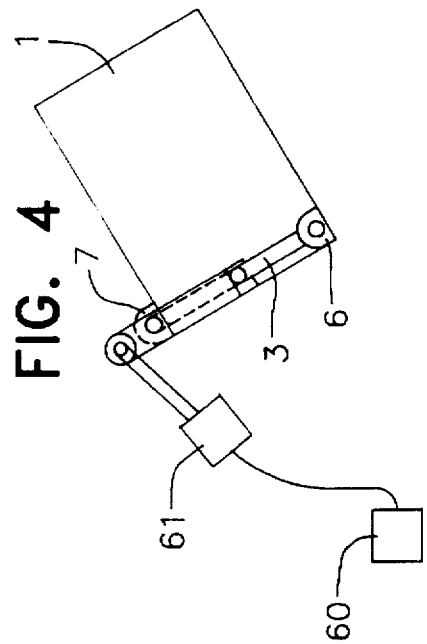

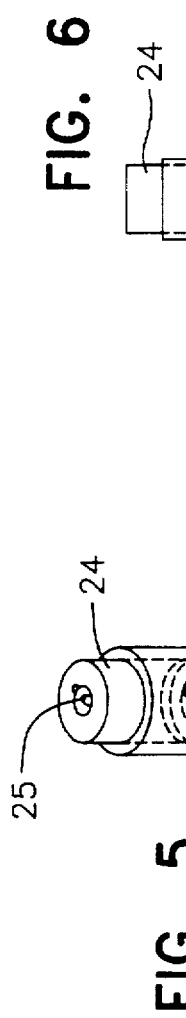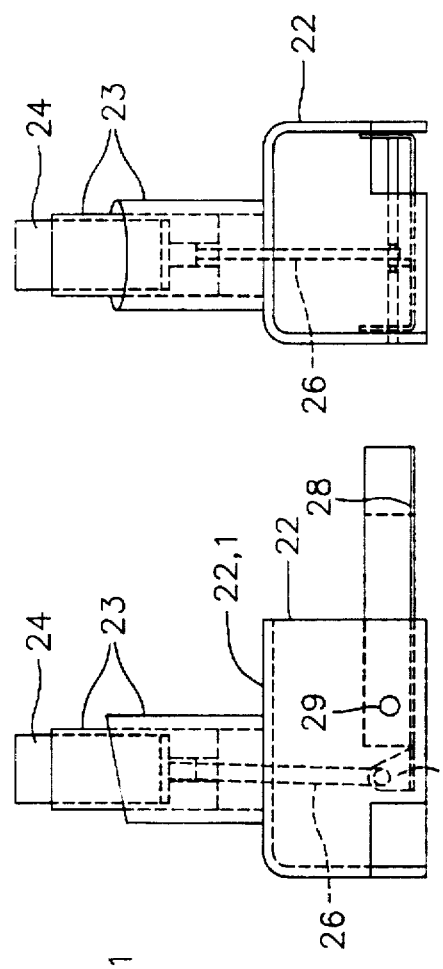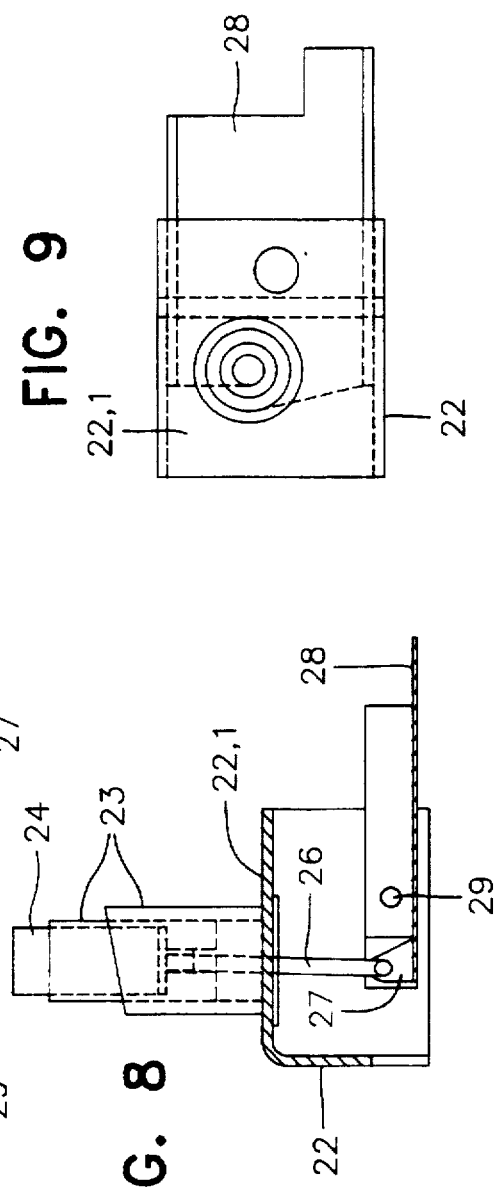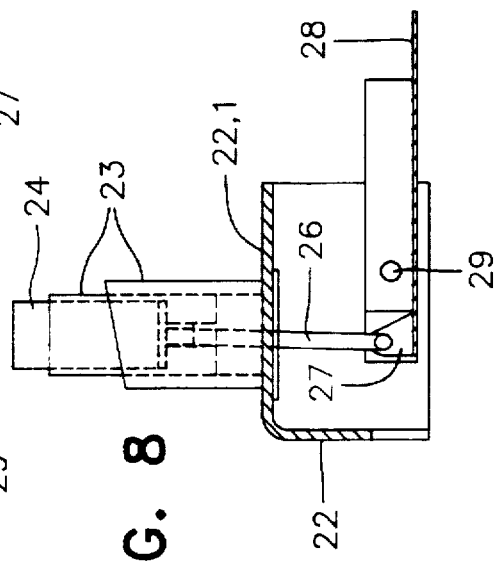

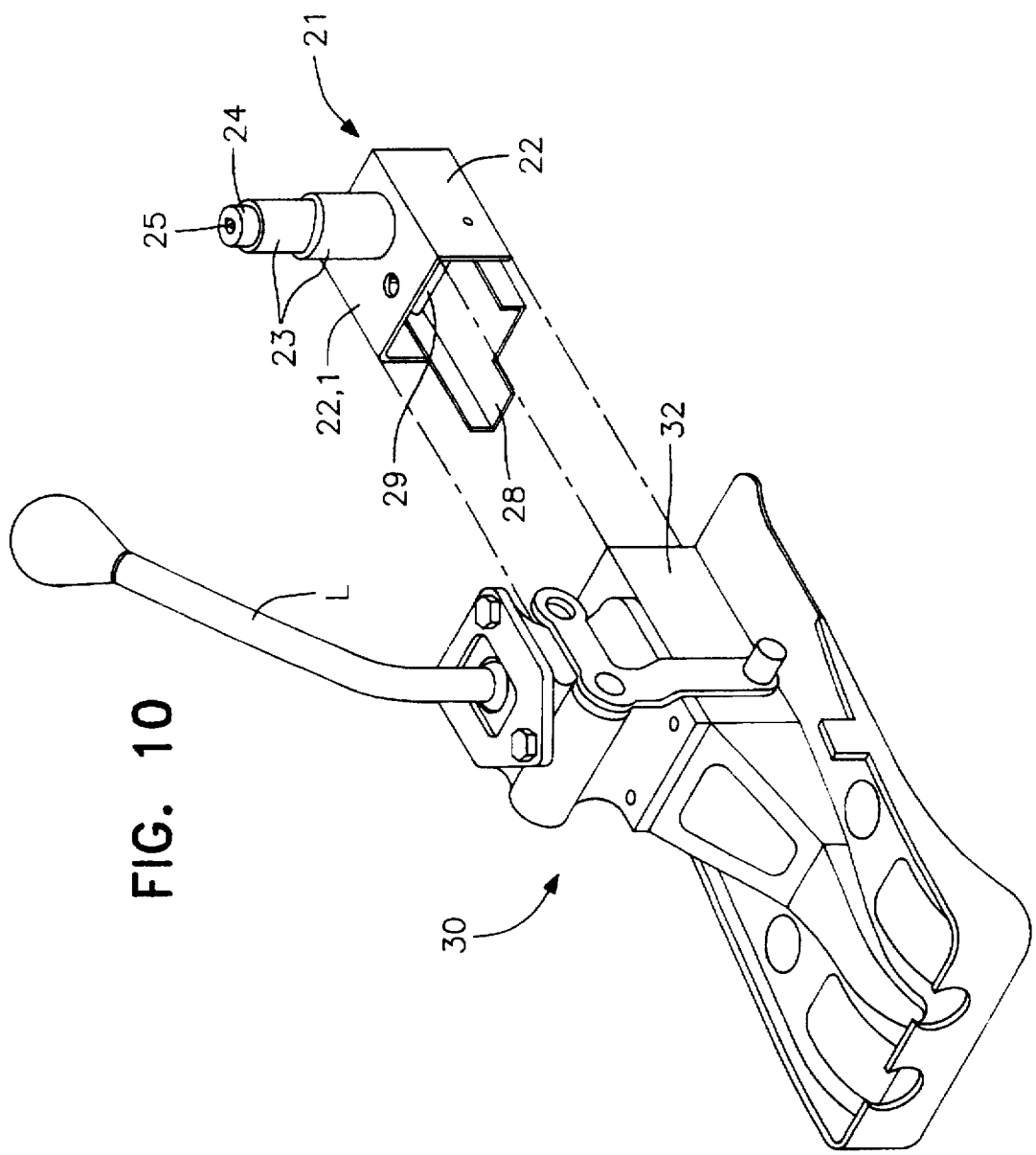

VEHICLE ANTI THEFT DEVICE

This invention lies in the field of anti theft devices for use in a vehicle, for example, an anti theft device locking the gear lever into a fixed position such as the reverse gear. However, within the ambit of a narrower scope, this invention is concerned with the actuating and locking means for such anti theft devices. Nonetheless, this invention could equally apply to locking and security devices in general.

The increase in the number of vehicle thefts has lead to the development of various anti theft devices. These anti theft devices include, amongst others, steering locks, steering and pedal locks, gear lever and hand brake locks, alarm systems, and immobiliser systems.

The disadvantage with most lockable anti theft devices of the prior art is that the locking means is visible and accessible inside the vehicle cabin, and therefore prone to tampering by a thief.

It is an object of this invention to provide an anti theft device for a vehicle which locks the gears into a fixed position, for example, the reverse position, which locking means is externally invisible, and not easily accessible therefore overcoming this disadvantage of the prior art.

Another object is to provide an embodiment of enhanced security within a housing which can be mounted partly in and partly against a gear change lever pedestal as a module which is sealed against ingress by a thief. This allows fast installation, giving a saving in an important component of cost.

In accordance with the present invention there is provided an anti theft device for vehicles which restricts the movement of a gear change lever, e.g. locks it into a fixed position, which comprises a locking plate adapted to fit inside the gear change lever retainer structure of a gear change lever mechanism. The locking plate is preferably provided with a hinge or pivot which facilitates hinged or pivotable movement of the locking plate. The hinge could comprise hinge lugs along at least one edge of the plate which are aligned with openings provided in opposite walls of the gear change lever retainer structure, and the locking plate is hinged to the gear change lever retainer structure by passing a hinge pin through the openings in the gear change lever retainer plate and the hinge lugs in the locking plate.

In another embodiment the anti theft device is provided in a housing made of robust material such as steel, which is bent in a U-shaped or channel like configuration, or a cast or forged U-shaped channel like configuration with one end closed such that the open end fits into the gear change retainer structure and is secured by means of at least one suitable fastener, for example a rivet, spot weld, bolt and nut, to the gear change retaining structure. The fastener preferably forms part of the gear change console, so that additional openings in this console are not required for accommodating the fasteners, and this in turn simplifies the installation process.

A sleeve is welded or suitably attached on the base of the U-shaped channel like housing, over a co-axial opening made in the base of the channel, such that when the channel is placed into the gear change retaining structure, the sleeve protrudes through suitable openings in the gear change retaining structure and extends to the surface of the gear change console in a manner such that this sleeve is flush with the console, and is not prominently visible when the lock is activated. The sleeve contains a high security barrel type lock which comprises a plunger free to move in the vertical plane. The plunger is preferably spring loaded, and is locked when depressed into the sleeve.

An actuating linkage is suitably hinged to the bottom end of the plunger such that it hingeably engages an actuating lever which is attached to the locking plate. This attachment can be made by passing the hinge pin of the locking plate through and opening at one end of the actuating lever, for example.

A lever may be welded, or suitably attached in a similar manner, to the hinge pin such that when the lever is pulled or pushed, the locking plate moves up or down respectively. When the locking plate is in the up position, it poses an obstacle to the bottom end of the gear change lever, and thereby, the gear change lever is locked into a fixed position, and the anti theft device has been activated. When the locking plate is moved into the down position, it is clear from any movements in the gear change lever since it lies flat on the console floor or floor pan of the vehicle, and thus is deactivated. Means for locking the locking plate into the up position is provided. A stopper for the locking plate is provided in at least one wall of the gear change lever retainer plate, so as to stop the locking plate, when pushed upwards, in the correct position. Preferably, the gear change lever is locked in the reverse position, so that even if a thief is able to start the car, he can only drive the vehicle in reverse, and therefore the thief will be deterred from stealing the vehicle.

An optional feature of this invention is to automatically activate and deactivate the anti theft device by means of a hidden switch or a remote control, for example. This is implemented by the provision of a rod or such similar structure attached to the lever, and the other side of the rod is attached to a linear motor or solenoid energised and de-energised by means of a relay. Suitable circuitry for the energising and de-energising of the linear motor is provided in the vehicle. The linear motor is suitably placed on the console floor of the vehicle such that it does not interfere with the operation of other parts of the vehicle.

The invention can be adapted to be fitted in all makes of vehicles, as well as vehicles with manual or automatic gearboxes. The invention can be supplied as original equipment fitted in vehicles or can be supplied to the after market for subsequent fitting.

The anti theft device in conjunction with the locking means is activated by placing the gear select lever into a selected gear position when the vehicle is parked, then depressing the plunger of the barrel lock which in turn engages the actuating lever by means of the actuating linkage, the actuating lever positions the locking plate in an upward position such that it restricts the movement of the gear change lever. By the turning the key provided for the barrel type lock, the locking plate is effectively held in this position until the anti theft device is disengaged by once again turning the key such the plunger of the barrel type lock is releasably pushed in the upward position, due to it being spring loaded, which in turn positions the locking plate in the downward resting position to allow free movement of the gear select lever.

An optional addition to the invention preferred by some vehicle manufacturers and insurers is that the function is provided that the ignition key is prevented from being removed unless the gear change lever is locked, therefore driver cannot withdraw ignition key without locking the gear change lever before leaving the car.

To achieve this function there is provided as a subsidiary feature of this invention an ignition-key interrupter.

The function of this is to prevent the removal of the ignition key unless the gear lock has been actuated.

A number of gear shift lock anti-theft devices of other constructions are presently available on the market. The main draw back to this system is the fact that there is no-way to ensure that the car driver does in fact activate the locking device before disembarking the vehicle.

By integrating the interrupter with the locking system it makes it impossible to withdraw the ignition key from the lock until the gear lock had been actuated.

For example, in many cars the ignition key can only be withdrawn after turning the key from the "run" to the "off" position. In so doing the movement passes through the "acc" (accessory) position and is interrupted there until the key is pressed inwards which then allows it to continue to the "off" position when it may be withdrawn.

In this example the interrupter consists of a steel pin which is so positioned that it slides in between the ignition barrel lock and the ignition switch operating shaft and limits the in and out movement of the ignition key and thus prevents the key from being pressed in to pass from the "Acc" position to the "off" position.

Movement in the pin is limited to about 5 mm and may be achieved by means of electric solenoid mechanical leverage or by air operated cylinder and plunger. Whichever means is chosen it will be arranged in such a way that should a failure in the system occur the pin would retract and enable the operator to withdraw their key in the normal way, i.e. a "fail safe" arrangement.

The invention will be more fully described by way of example with reference to the accompanying drawings in which:

FIG. 1 shows a right side view of the anti theft device in accordance with an embodiment of the invention housed within the gear change lever retainer plate, FIG. 2 shows a rear end view of the same device, FIG. 3 shows a bottom view of the same device.

Figure 12:
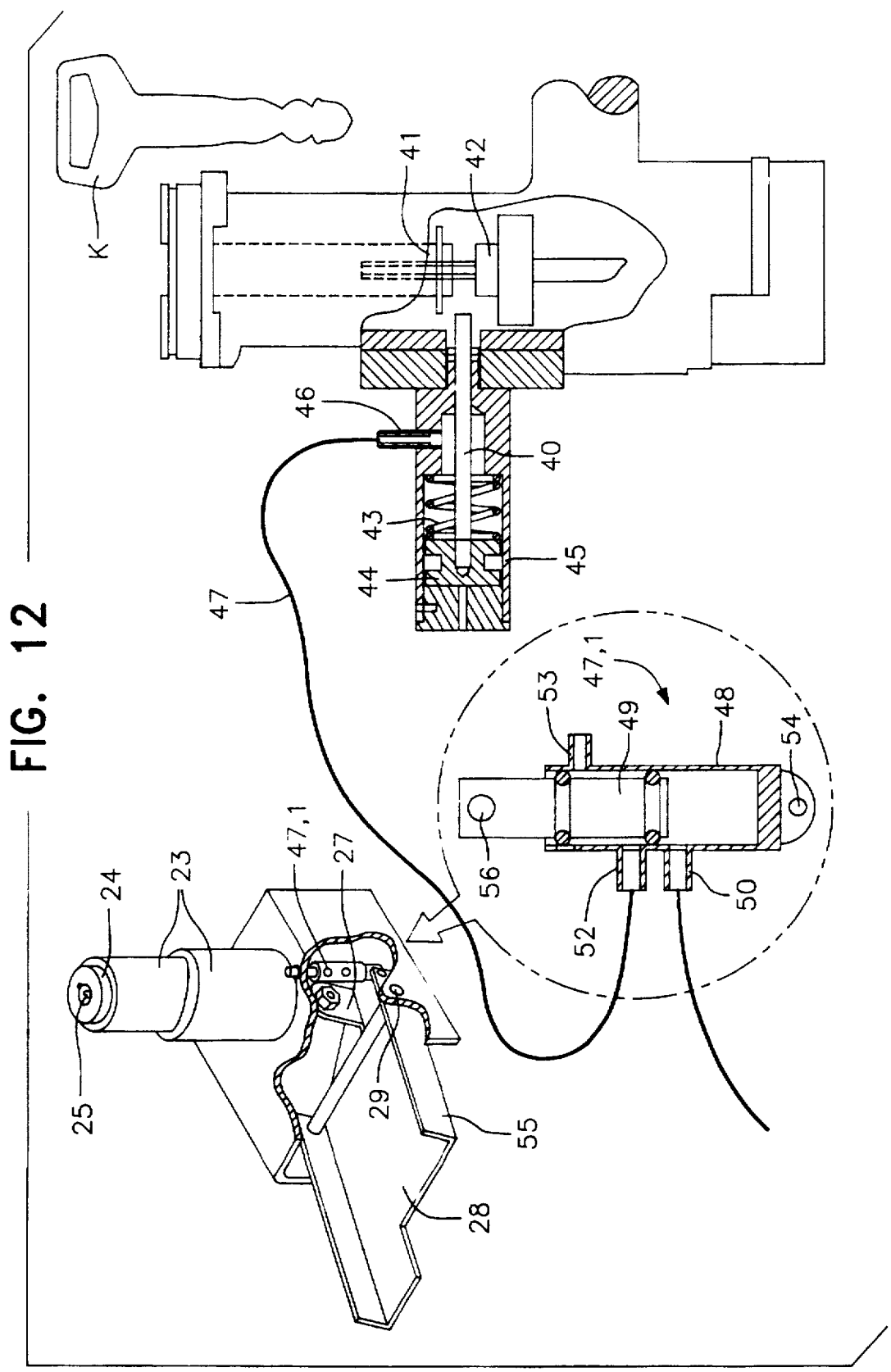

FIG. 4 shows an perspective view of the locking plate together with its attachments, FIG. 5 is an isometric view of an anti-theft device in accordance with the preferred embodiment showing it in an engaged position, FIG. 6 is a side elevation of the device in FIG. 5, FIG. 7 is an end elevation thereof, of the vehicle, FIG. 8 is a sectioned side elevation thereof, FIG. 9 is a plan view thereof, FIG. 10 is an isometric view of the manner in which the device is attached to the gear shift console of the vehicle, FIG. 11 is a schematic view of an ignition key interrupter in the gear lock disengaged condition, and FIG. 12 is a similar view thereof in the engaged position.

As shown in FIG. 1, locking plate 1 is placed behind the gear change lever L inside the gear change lever retaining structure 2. The gear change lever retaining structure 2, as shown in FIG. 2, is in the form of a U-shaped plate, and the locking plate is movably attached to the gear change lever retaining structure by means hinge pin 3, shown in FIG. 4, which is passed through openings 4 and 5 (shown in FIG. 2) in the gear change lever retaining structure and hinge lugs 6 and 7 as shown in FIG. 4. The hinge assembly allows the locking plate 1 to rotate in an upward or downward position. To facilitate this rotation of the locking plate 1, lever 8 is affixed to hinge pin 3, by passing the hinge pin through an opening in the lever, and is welded, or attached in such similar way, to locking plate 1.

The anti theft device is activated by pulling lever 8 so that plate 1 is rotated upwards (arrow A) as shown in FIG. 1. Stopper 9, shown in FIGS. 2 and 3, which comprises preferably a screw or bolt affixed to a wall of the gear change lever retaining structure 2, restricts the movement of locking plate 1 to beyond this point. At the point where the locking plate 1 is stopped by stopper 9, the front edge of this plate is placed against the bottom part 10 of gear lever L. FIG. 1 shows the gear lever 10 in the reverse position, in the case where the gear is placed in reverse by sliding the gear lever backwards above the pivot point 11. Accordingly, the lower portion of the gear lever 10, below the pivot point, moves forward. While the anti theft device is activated, it prevents the selection of any other gear since the locking plate forms an obstacle to the movement of the bottom part of the gear lever, below the pivot point 11, in a backward direction.

An important feature of this embodiment of the invention is that attempts to force the gear change lever will not strain the actuating lever and locking mechanism. Force on the gear change lever will not cause any torque on the plate, hence no force on the actuating lever, but will apply force directly in line with the plate which will be borne by the hinge pin; this can be made robust enough to sustain the force.

The anti theft device can be accordingly adapted to lock the gear lever L in any gear, however, the locking of the gear in a reverse position proves to be more effective, since the vehicle is restricted to motion in the reverse direction only.

The deactivation of the anti theft device involves the pushing of lever 8 in a forward direction, which rotates the locking plate 1 in a downward position, (arrow B) and this plate rest on the console floor under the gear change lever retaining plate 2. FIG. 1 shows the locking plate in the activated mode, with the deactivated mode illustrated by the locking mechanism drawn in dashed lines. When the locking plate 1 is deactivated, it lies flush on the floor console, with sufficient clearance to allow the gear lever 10 to move freely.

A preferable feature of this invention is the facility to activate and deactivate the anti theft device by electronic means. This is accomplished by the provision of a rod 12, or such similar means, attached to the top end of lever 8. The attachment can be implemented by means of a suitable fastener 13, for example, a nut and bolt assembly. The other end of rod 12 is attached to a linear motor 61 comprising a solenoid to energise and de-energise the motor. The linear motor 61 is shown schematically in the accompanying drawings. The linear motor will be suitably placed in the car so as not to interfere with other operating parts in the vehicle. Suitable circuitry, to energise and de-energise the linear motor by means of a hidden switch, or a remote control 60, for example, will be accordingly provided in the vehicle.

Upon energising of the anti theft device, the linear motor will pull rod 12 backwards, which in turn pulls lever 8 and rotates locking plate 1 upwards, thereby restricting the movement of gear lever 10. Means is provided to lock the locking plate in this position, or the plate could be held in this position by keeping the solenoid in an energised state.

As shown in FIGS. 5 to 9, the locking device 21 comprises a housing in the form of plate 22, made of steel for the purposes of a robust construction, bent into a U-shaped or channel like configuration, or cast or forged into a U-shaped channel like configuration. The channel is positioned such that its base 22,1 faces upwards. Sleeve 23 is welded or suitably attached to the channel 22 such that it is positioned co-axially to an opening in plate 22. A barrel type lock 24 comprising a plunger is spring loaded inside sleeve 23. The lock has a key slot 25 to accommodate a security key for the purposes of activating and deactivating the lock such as to reduce the possibility of unauthorised access to the lock.

Barrel type lock 24 comprising a plunger is free to move in a vertical plane inside sleeve 23. Actuating linkage 26 is suitably hinged to the bottom end of barrel type lock 24. This linkage is further hingedly attached to actuating lever 27 which, by being attached to locking plate 28, facilitates the upward and downward movement of locking plate 28. This attachment can be accomplished by passing pin 29 of the locking plate, through a hole in one end of actuating lever 27.

The device of FIGS. 5 to 9 can be seen in FIGS. 11 and 12, and as shown in FIG. 12, the anti theft device is activated by depressing the barrel type lock 24 inside the sleeve 23 which in turn engages actuating lever 27 via actuating linkage 26, which raises locking plate 28 such that it restricts the movement of the gear select lever of the vehicle. The barrel type lock 24, clicks into a locked position when pushed down to the position shown in FIG. 12. To deactivate the locking device, the key is inserted into slot 25 and turned in barrel type lock 24, upon which the lock will be released and pushed in the upward position, due to it being spring loaded, and locking plate 28 will lie in the rest position via actuating linkage 26 and actuating lever 27, as shown in FIG. 11. The gear shift lever is free to resume its normal modes of operation.

FIG. 10 illustrates the way in which the locking module 21 is fitted inside the gear select mechanism console 30. Preferably, the locking module is fitted into the rear part of the gear change retainer housing 32, and is fastened by suitable means, for example a bolt and nut assembly, to this housing. The fastening is effected by means of passing the fastener through an opening in channel 22, which is aligned with a co-axial opening in the gear select console housing 32. When the locking means is fitted inside the gear select console, the barrel type lock, when in the depressed locked position, would appear flush against the gear select console inside the cabin of the vehicle, thereby not making it prominently visible to a potential thief nor easily accessible for tampering.

FIGS. 11 and 12 show the interrupter to consist of a steel pin 40 which slides in between the ignition barrel lock 41 and the ignition switch operating shaft 42 thereby limiting axial movement of the ignition key. Since the key mechanism is of the kind which must be pushed in axially to turn it to the "off" position from which the key can be withdrawn from the barrel lock, the withdrawal of the key is effectively prevented. The pin 40 is spring loaded by spring 43 to move out of the engagement position shown and actuated by a piston 44 and cylinder 45 vacuum operated to move the pin into the engagement position shown. The vacuum is applied to the cylinder via a tube 46 connected (47) to the gear change lever locking device 21 at which a valve 47.1 is linked to the device so that the vacuum is applied to the tube until the locking device is locked and the valve closed to remove the vacuum when the gear change lever is locked so that the pin withdraws to free the key mechanism to allow withdrawal of the key.

FIGS. 11 and 12 show the valve 47 in enlarged detail. It comprises a cylinder 48 with plunger 49, sealed by O-rings in slideable relationship. Vacuum (e.g. from the inlet manifold) is applied to a tube 50 via line 51 and hence, when in the disengaged position of FIG. 11, to the tube 52 and thence via line 47 to the cylinder 45 to lock the key K to be non-removable. When the device 21 is moved to lock the gear lever in reverse, as in FIG. 12, the plunger 49 connects ambient air via tube 53 to the tube 52 and hence, via line 47 to relieve the vacuum, allowing spring 43 to move the pin 40 to the unlocked position in which the key K can be removed.

Since cylinder 48 is hingedly connected via hole 54 to the flange 55 of the locking plate 28 and the plunger 49 via hole 56 to the housing 22.1, movement of the locking plate causes the movements of the cylinder and plunger described.

I claim:

1. An anti-theft device for vehicles having a gear change lever in a gear change mechanism, said anti theft device comprising a housing of an inverted U-shaped channel form, said housing fitting, at least partially, in the gear change mechanism, a locking plate pivotally mounted in said housing and adapted to pivot along an axis which is transverse to the longitudinal axis of a lower portion of the gear shift lever, a hinge mounted on one end of said locking plate and in said housing for hinged movement of the locking plate, said hinge being movable between a position where the locking plate is adapted to contact and restrict movement of the gear change lever by engaging one end of the gear change lever such that force applied to the gear change lever in a direction is transferred in said direction along said locking plate to said hinge and by said hinge to said housing and said hinge being movable to another position where the gear change lever is left free to move without interference from said locking plate.

2. An anti-theft device as claimed in claim 1, wherein the housing has a sleeve extending upwardly from the housing for penetrating a gear change console and said sleeve including a lock mechanism to lie flush with and be visible from above the console.

3. An anti-theft device as claimed in claim 2, wherein a linkage extends between the locking plate and a lock for locking the locking plate in the position restricting the movement of the gear change lever, and the lock is a barrel type lock comprising a plunger spring loaded inside the sleeve.

4. An anti-theft device as claimed in claim 1, wherein a valve is connected to the locking plate in combination with an ignition assembly of the vehicle, the valve being connected by a first vacuum line to a vacuum source and the valve being connected by a second vacuum line to the ignition assembly for preventing withdrawal of an ignition key from the ignition assembly unless the gear change lever has been locked by the locking plate.

* * * * *